United States Patent
Lee et al.

(10) Patent No.: US 8,647,793 B2
(45) Date of Patent: Feb. 11, 2014

(54) SOLID PROTON CONDUCTOR FOR FUEL CELL AND FUEL CELL USING THE SAME

(75) Inventors: Myung-jin Lee, Seoul (KR); Suk-gi Hong, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 764 days.

(21) Appl. No.: 12/640,293

(22) Filed: Dec. 17, 2009

(65) Prior Publication Data

US 2010/0167103 A1 Jul. 1, 2010

(30) Foreign Application Priority Data

Dec. 26, 2008 (KR) .................. 10-2008-0134969
Jun. 5, 2009 (KR) .................. 10-2009-0049915

(51) Int. Cl.
*H01M 8/10* (2006.01)

(52) U.S. Cl.
USPC .......................................... 429/492; 429/493

(58) Field of Classification Search
USPC ................................................. 429/492, 493
See application file for complete search history.

(56) References Cited

U.S. PATENT DOCUMENTS

| | | | |
|---|---|---|---|
| 6,994,837 B2 | 2/2006 | Boulos et al. | |
| 7,736,547 B2* | 6/2010 | Garzon et al. | 252/520.1 |
| 2005/0147859 A1 | 7/2005 | Kiefer et al. | |
| 2007/0054194 A1* | 3/2007 | Zhang et al. | 429/313 |
| 2009/0169956 A1 | 7/2009 | Lee et al. | |
| 2009/0246591 A1* | 10/2009 | Roelofs | 429/33 |

FOREIGN PATENT DOCUMENTS

| | | |
|---|---|---|
| JP | 2005-11790 | 1/2005 |
| JP | 2005-527075 | 9/2005 |
| JP | 2006-66353 | 3/2006 |
| JP | 2006-073495 | 3/2006 |
| JP | 2008218408 A | 9/2008 |
| KR | 10-2005-0004796 | 1/2005 |
| KR | 10-2005-0089027 | 9/2005 |
| KR | 100803199 B1 | 2/2008 |

OTHER PUBLICATIONS

Kim et al. "*Anhydrous Proton-Conducting Properties of Nafion-1,2,4-Triazole and Nafion-Benzimidazole Membranes for Polymer Electrolyte Fuel Cells*", Journal of the Electrochemical Society, 154 (4), A290-A294 (2007).

Q. Li et al., "PBI-Based Polymer Membranes for High Temperature Fuel Cells-Preparation, Characterization and Fuel Cell Demonstration," Fuel Cells, vol. 4, No. 3, 2004, pp. 147-159.

K. D. Kreuer et al., "Imidazole and pyrazole-based proton conducting polymers and liquids," Electrochimica Acta, vol. 43, Nos. 10-11, 1998, pp. 1281-1288.

P. Heo, K. Hagiwara, R. Ichino, M. Okido, •Electrodeposition and thermoelectric characterization of Bi2Te3, Journal of The Electrochemical Society, 153, C213-C217 (2006). Science Citation Index [SCI].

(Continued)

*Primary Examiner* — Mark F Huff
*Assistant Examiner* — Monique Wills
(74) *Attorney, Agent, or Firm* — Cantor Colburn LLP (57) ABSTRACT

A solid proton conductor for a fuel cell and a fuel cell employing the solid proton conductor, the solid proton conductor including a sulfonated polymer, and a hydrophilic polymer having an acid group, constituting a polymer solvent, providing a proton mobile path.

18 Claims, 5 Drawing Sheets

(56) References Cited

OTHER PUBLICATIONS

P. Heo, N. Kajiyama, K. Kobayashi, M. Nagao, M. Sano, T. Hibino, •Proton Conduction in Sn0.95Al0.05P2O7-PBI-PTFE Composite Membran, Electrochemical and Solid-State Letters, 11, B91-B95 (2008). Science Citation Index [Sci].

M. Nagaoa A. Takeuchi, P. Heo, T. Hibino, M. Sano, A. Tomita, •A Proton-Conducting In3+-doped SnP2O7 Electrolyte for Intermediate-Temperature Fuel Cells, Electrochemical and Solid-State Letters, 9, A105-A109 (2006). Science Citation Index [Sci].

M. Nagao, T. Kamiya, P. Heo, A. Tomita, T. Hibino, M. Sano, •Proton Conduction In.1n3+-doped SnP2O7 at Intermediate Temperatures, Journal of the Electrochemical Society, 153, A1604-A1609 (2006). Science Citation Index [Sci].

M. Nagao, P. Heo, T. Kamiya, A. Tomita, T. Hibino, M. Sano, Proton Conduction in In3+-doped SnP2O7 with Various P/(Sm+In) Ratios, ECS Transaction, 2, 43-49 (2007).

P. Heo, H. Shibata, M. Nagao, T. Hibino, M. Sano, Performance of an Intermediate-Temperature Fuel Cells Using a Proton-Conducting Sn0.9In0.1P2O7 Electrolyte, Journal of the Electrochemical Society, 153, A897-A901 (2006). Science Citation Index [SCI].

P. Heo, R. Ichino, M. Okido, •ZnTe electrodeposition from organic solvents, Electrochimica Acta, 51, 6325-6330 (2006). Science Citation Index [SCI].

P. Heo, M. Nagao, M. Sano, T. Hibino, •A High Performance Pt-Free Anode for Intermediate-Temperature Fuel Cells, ECS Transaction, 3, 453-458 (2006).

P. Heo, M. Nagao, M. Sano, T. Hibino, A High Performance Mo2C-ZrO2 Anode Catalyst for Intermediate-Temperature Fuel Cells, Journal of The Electrochemical Society, 154, B53-B56 (2007), Science Citation Index [SCI].

P. Heo, M. Nagao, T. Kamiya, M. Sano, A. Tomita, T. Hibino, Sn0.9In0.1P2O7 Based Organic/Inorganic Composition.membranes: Application to Intermediate-Temperature Fuel Cells, Journal of The Electrochemical Society, 154, B63-B67 (2007). Science Citation Index [SCI].

P. Heo, A. Tomita, T. Hibino, An Intermediate-Temperature Fuel Cell Using a Proton-Conducting Sn0.9In0.1P2O7 Electrolyte, Transactions of the Materials Research Society of Japan, 32, 951-954 (2007).

P. Heo, M. Nagao, M. Sano, T. Hibino, Direct Dimetyl Ether Fuel Cells at Intermediate Temperatures, Journal of The Electrochemical Society, 155, B92-B95 (2008). Science Citation Index [SCI].

P. Heo, H. Shibata, M. Nagao, T. Hibino, •Pt-Free Intermediate-Temperature Fuel Cells, Solid State Ionics, in press (2008). Science Citation Index [SCI].

* cited by examiner

SOLID PROTON CONDUCTOR FOR FUEL CELL AND FUEL CELL USING THE SAME

CROSS-REFERENCE TO RELATED APPLICATIONS

This application claims the benefit of Korean Application Nos. 10-2008-0134969, filed Dec. 26, 2008 and 10-2009-0049915, filed Jun. 5, 2009 in the Korean Intellectual Property Office, the disclosures of which are incorporated herein by reference.

BACKGROUND

1. Field

One or more embodiments relate to a solid proton conductor for a fuel cell, and a fuel cell using the same.

2. Description of the Related Art

The development of a hydrogen conductive material that conducts protons at high temperatures and under low humidified conditions, is one of the issues that is to be improved in polymer electrolyte membrane fuel cell (PEMFC) technology.

An electrolyte membrane that may be operated at high temperatures may be obtained by replacing water used in an existing acid electrolyte membrane or by using a hydrogen solvent having a high boiling point. Accordingly, an electrolyte membrane including phosphoric acid and polybenzimidazole and which may be operated in a fuel cell at temperatures of up to 200° C. has been reported.

However, a catalyst in the fuel cell may be poisoned by the phosphoric acid, or the phosphoric acid may be washed away by a reactant while operating a PEMFC for a long time at temperatures of 100° C. or lower.

As a proton conductor that may replace water at a temperature of about 150 to about 250° C., a heterocyclic compound, such as imidazole, pyrazole, or benzimidazole, has been developed (Journal of The Electrochemical Society, 2007, 154(4) 290-294).

The heterocyclic compound has autoprotolysis, and forms a hydrogen bond network, and thus is known to have higher hydrogen conductivity than water.

However, the heterocyclic compound is volatile since a molecular weight of the heterocyclic compound is low. Accordingly, in order to apply the heterocyclic compound in a fuel cell to be operated at high temperatures, the heterocyclic compound is to be directly fixed to a polymer electrolyte membrane in order to maintain liquidity and hydrogen ion mobility, and many synthesizing processes are to be performed. Moreover, a yield of the heterocyclic compound is low.

SUMMARY

One or more embodiments include a proton conductor for a fuel cell, which has excellent proton conductivity under non-humidified conditions, an electrode for a fuel cell including the proton conductor, an electrolyte membrane for a fuel cell including the proton conductor, and a fuel cell employing the electrolyte membrane.

Additional aspects will be set forth in part in the description which follows and, in part, will be apparent from the description, or may be learned by practice of the presented embodiments.

To achieve the above and/or other aspects, one or more embodiments may include a solid proton conductor for a fuel cell, the solid proton conductor including: a sulfonated polymer; and a hydrophilic polymer having an acid group, constituting a polymer solvent, providing a proton mobile path.

According to an embodiment of the present invention, the hydrophilic polymer may include a polymer containing sulfonated phosphoric acid.

To achieve the above and/or other aspects, one or more embodiments may include an electrolyte membrane for a fuel cell, the electrolyte membrane including the solid proton conductor.

To achieve the above and/or other aspects, one or more embodiments may include an electrode for a fuel cell, the electrode including the solid proton conductor.

To achieve the above and/or other aspects, one or more embodiments may include a fuel cell including: a cathode; an anode; and an electrolyte membrane disposed between the cathode and the anode, wherein at least one of the group consisting of the cathode, the anode, and the electrolyte membrane includes the solid proton conductor.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A solid proton conductor for a fuel cell according to an embodiment includes a sulfonated polymer used as a hydrocarbon based support, and a hydrophilic polymer having an acid group, constituting a polymer solvent, providing a proton mobile path.

The hydrophilic polymer may be a phosphoric acid group containing polymer.

The phosphoric acid group containing polymer is a polymer solvent providing a proton mobile path, and obtains proton conductivity by providing a proton path of a sulfonic acid group of the sulfonated polymer.

The phosphoric acid group containing polymer is a polymeric reaction resultant of a monomer having a phosphoric acid group, i.e. a phosmer, and may be obtained via a polymeric reaction of a phosmer and a polymeric initiator.

Examples of the phosmer include compounds represented by Formulas 1 and 1a.

Formula 1

Here, X is an unsubstituted or substituted C1-C20 alkylene group, a is an integer in the range of about 1 to about 10, R1 is hydrogen or a C1-C20 alkyl group, R2 is hydrogen, an unsubstituted or substituted C1-C20 alkyl group, an unsubstituted or substituted C1-C20 hydroxylalkyl group, or an unsubstituted or substituted C1-C20 hydroxyalkylamino group.

Formula 1a

Here, X and Y are each independently an unsubstituted or substituted C1-C20 alkylene group, a and b are each independently an integer in the range of about 1 to about 10, and R1 and R3 are each independently hydrogen or a C1-C20 alkyl group.

The compound of Formula 1 or 1a may be at least one of the compounds represented by Formulas 2 through 7 below.

Formula 2

Formula 3

Here, n is an integer in the range of about 2 to about 10, and according to an embodiment, n is 4 or 5.

Formula 4

Formula 5

Here, n is an integer in the range of about 2 to about 10, and according to an embodiment, n is 5 or 6.

Formula 6

Here, R10 and R13 are each independently a C1-C20 alkyl group, R11 and R12 are each independently hydrogen or a C1-C20 alkyl group, and t and w are each independently an integer in the range of about 1 to about 10.

Formula 7

A weight average molecular weight of the polymer solvent may be about 1,000 to about 1,000,000, about 10,000 to about 100,000, and about 50,000 to about 80,000 g/mol.

A weight average molecular weight of the sulfonated polymer may be about 100,000 to about 1,000,000, and about 400,000 to about 600,000.

A mixing mole ratio of the sulfonated polymer and a monomer for forming the hydrophilic polymer may be about 1:1 to about 1:10, and about 1:3 to about 1:5.

An example of the monomer for forming the hydrophilic polymer includes a phosmer for forming a phosphoric acid group containing polymer.

The mixing mole ratio is determined by calculating each of a molecular weight in a repeating unit of the sulfonated polymer and a phosphoric acid group containing monomer to determine the number of moles of the sulfonated polymer and the phosphoric acid group containing monomer.

The solid proton conductor according to the present embodiment may further include at least one additive selected from the group of additives consisting of oxide nano particles, which is acid processed to improve mechanical intensity and conductivity of the solid proton conductor, and oxide nano rods that are acid processed.

The oxide may be at least one selected from the group consisting of titania ($TiO_2$), silica ($SiO_2$), and tin oxide ($SnO_2$).

The additive may include at least one additive selected from the group of additives consisting of acid processed titania ($TiO_2$) nano particles, acid processed titania ($TiO_2$) nano rods, acid processed silica ($SiO_2$) nano particles, and acid processed silica ($SiO_2$) nano rods.

The amount of the additive may be about 1 to about 30 parts by weight based on 100 parts by weight of the total amount of the sulfonated polymer and the monomer for forming the hydrophilic polymer. When the amount of the additive is less than 1 part by weight, the mechanical intensity and the conductivity of the solid proton conductor may not increase by adding the additive, and when the amount of the additive is greater than 30 parts by weight, solubility of the additive decreases, and thus film formation may be difficult.

An example of the monomer for forming the hydrophilic polymer includes a monomer phosmer for forming a phosphoric acid group containing polymer.

According to an embodiment, nano particles improve mechanical characteristics of a membrane, and improve an ion transmitting capability by breaking crystallization of a polymer solvent to make the polymer solvent amorphous. Additionally, by absorbing hydrogen ions into a surface of the nano particles, proton concentration in the membrane increases, and a proton mobile path is provided as protons move along surfaces of the particles.

A solid proton conductor according to another embodiment may further include a compound represented by Formula 10 below, so as to improve mechanical intensity and proton conductivity.

Formula 10

Here, A is one selected from the group consisting of tin (Sn), titanium (Ti), silicon (Si), germanium (Ge), lead (Pb), zirconium (Zr), hafnium (Hf), and any combinations thereof, B is one selected from the group consisting of indium (In), boron (B), aluminum (Al), gallium (Ga), scandium (Sc), ytterbium (Yb), yttrium (Y), and any combinations thereof, and x is in a range of about 0.001 to about 0.1.

Examples of the compound of Formula 10 include $Sn_{0.9}In_{0.1}P_2O_7$ and $Sn_{0.9}Al_{0.1}P_2O_7$, which are indium-doped tin phosphate-based compounds.

An amount of the compound of Formula 10 is about 1 to about 30 parts by weight based on 100 parts by weight of the total amount of the sulfonated polymer and the monomer for forming the hydrophilic polymer.

When the amount of the compound of Formula 10 is in the above range, mechanical intensity and conductivity of an electrolyte membrane increase without deterioration of film formation of the electrolyte membrane.

In the solid proton conductor according to an embodiment, hydrogen ions of a sulfonic group at a terminal of the sulfonated polymer, which is a hydrocarbon support, form an optimized structure with oxygen atoms of a phosmer main chain, which is the polymer solvent, and simultaneously, the phosmer is polymerized so as to form a network with the hydrocarbon support. In anhydrous conditions, a phosphoric acid group of the polymerized phosmer improves proton conductivity, and has excellent proton conductivity as protons of a sulfonic group move along a path of the sulfonated polymer.

The solid proton conductor according to the present embodiment is insoluble to water, and thus may be easily manufactured as a thin membrane. By using such a solid proton conductor, a polymer electrolyte membrane for a fuel cell having excellent proton conductivity may be prepared. Also, the polymer electrolyte membrane having excellent proton conductivity is obtained without using a liquid medium, such as water or phosphoric acid. Also, the polymer solvent used in the solid proton conductor does not have volatility and maintains mechanical characteristics of the polymer electrolyte membrane, compared to a related mono-solvent.

Also, the solid proton conductor according to the present embodiment may be coated on a surface of an electrode or added to a composition for forming an electrode.

By using the solid proton conductor according to the present embodiment, deterioration of durability and mechanical intensity of the polymer electrolyte membrane due to repeated expansion and contraction when a liquid medium, such as water or phosphoric acid, is used, and leakage of water generated due to a fuel reaction are prevented. Also, catalyst poisoning is prevented, and a battery system is simplified since a humidifier may not be included in the battery system.

A method of preparing an electrolyte membrane using a solid proton conductor, according to an embodiment, will now be described.

First, a sulfonated polymer, and a phosphoric acid group containing monomer, constituting a polymer solvent providing a proton mobile path, are mixed and stirred with a solvent and a polymeric initiator. Here, the solvent may be N-methylpyrrolidone (NMP) or dimethyl acetamide (DMAC), and the amount of the solvent may be about 50 to about 100 parts by weight based on 10 parts by weight of the sulfonated polymer.

The sulfonated polymer may be at least one selected from the group consisting of sulfonated polyarylenesulfone, a perfluorinated sulfonic acid group containing polymer, and sulfonated polyether ether ketone. An example of the sulfonated polymer includes a compound represented by Formula 8.

Formula 8

Here, the R1s are each independently a C1-C10 alkyl group, a C2-C10 alkenyl group, a phenyl group, or a nitro group, p is an integer in the range of about 0 to about 4, X is —C(CF3)2-, —C(CH3)2-, or —PY'(=O)—(Y' is H or C6H5), M is Na, K, or H, m is a real number in the range of about 0.1 to about 10, n is a real number in the range of about 0.1 to about 10, and k is a real number in the range of about 5 to about 500.

According to an embodiment, the sulfonated polymer may be represented by Formula 9 below.

Formula 9

Here, m is a real number in the range of about 0.1 to about 4, n is a real number in the range of about 0.1 to about 4, and k is a real number in the range of about 5 to about 500.

The polymeric initiator initiates a polymeric reaction of a phosmer, constituting the phosphoric acid group containing monomer, and may be asobisisobuthyrronitrile (AIBN), or benzoin ethyl ether. Here, the amount of the polymeric initiator may be about 1 to about 3 parts by weight based on 100 parts by weight of the phosphoric acid group containing monomer, for good reactivity of a polymeric reaction of the phosphoric acid group containing monomer.

The resultant is stirred at room temperature (20-25° C.) and then heat treated so as to prepare a polymer electrolyte membrane.

The heat treatment may be performed at a temperature in the range of about 60 to about 120° C. When the temperature is in the above range, reactivity of a polymeric reaction of the phosphoric acid group containing monomer is good.

While mixing the sulfonated polymer, the polymer solvent, and the solvent, an additive including at least one of a group consisting of acid processed oxide nano particles and acid processed oxide nano rods, may be further added, in order to improve the mechanical characteristics of the polymer electrolyte membrane.

The acid processed oxide nano particles may be obtained by acid processing nano particles formed of at least one oxide selected from the group consisting of titania ($TiO_2$), silica ($SiO_2$), and tin oxide ($SnO_2$).

The acid processed oxide nano particles are obtained by stirring oxide nano particles in an acid solution, such as sulfuric acid, phosphoric acid, or acetate acid, repeatedly performing centrifugal separation and cleaning the mixture, and then drying the mixture at a temperature in a range of about 80 to about 100° C.

The concentration of the acid solution may be in a range of about 10 to about 30 wt %.

The acid processed oxide nano rods are obtained by impregnating the acid processed oxide nano particles obtained as above in a strong alkali aqueous solution, and then heat treating the resultant at a temperature in the range of about 150 to about 180° C.

The electrolyte membrane prepared according to the current embodiment has excellent proton conductivity even under non humidified conditions or an anhydrous state.

A fuel cell may be manufactured by disposing a cathode and an anode on each side of the electrolyte membrane described above, according to an embodiment.

Like the electrolyte membrane, at least one of the group consisting of the cathode and the anode may include a polymeric resultant of the sulfonated polymer and the phosphoric acid group containing monomer.

A method of manufacturing an electrode according to an embodiment, the electrode including the polymeric resultant of the sulfonated polymer and the phosphoric acid group containing monomer, will now be described.

First, a composition for forming an electrode catalyst layer is prepared by mixing a catalyst, a binder, a sulfonated polymer, a phosphoric acid group containing monomer, a polymeric initiator, and a solvent.

The solvent may be NMP or dimethylacetamide (DMAc), and the amount of the solvent is in the range of about 1 to about 10 parts by weight based on 1 part by weight of the catalyst.

The composition is then coated on a surface of a carbon support. Here, it is convenient to coat the composition on the carbon support by fixing the carbon support on a glass board. The coating method is not specifically limited, and a coating method using a doctor blade, a bar coating method, or a screen printing method may be used.

After coating the composition on the surface of the carbon support, the resultant is heat treated at a temperature in the range of about 60 to about 120° C. During the heat treatment, a polymeric reaction of the phosphoric acid group containing monomer occurs, and accordingly, the manufacture of the electrode containing the sulfonated polymer and the phosphoric acid group containing polymer is completed.

The catalyst may be a catalyst metal such as platinum (Pt) or an alloy or mixture of platinum and at least one of a group consisting of gold, palladium, rhodium, iridium, ruthenium, tin, molybdenum, cobalt, and chromium, or a carrier catalyst, wherein the catalyst metal is supported in a carbon based carrier. According to an embodiment, the catalyst may be at least one catalyst metal selected from the group consisting of platinum, platinum cobalt (PtCo), and platinum ruthenium (PtRu), or a supported catalyst, wherein the catalyst metal is supported in a carbon based carrier.

The electrode may further include a binder that is generally used to manufacture an electrode.

The binder may be at least one selected from the group consisting of poly(vinylidenfluoride), polytetrafluoroethylene, a tetrafluoroethylene-hexafluoroethylene copolymer, and perfluoroethylene. The amount of the binder may be in the range of about 0.001 to about 0.5 parts by weight based on 1 part by weight of the catalyst. When the amount of the binder is less than 0.001 parts by weight based on 1 part by weight of the catalyst, wetness of the electrode may not be improved, and when the amount of the binder is greater than 0.5 parts by weight based on 1 part by weight of the catalyst, flooding of phosphoric acid may be accelerated.

The fuel cell according to the present embodiment is not specifically limited, and may be, for example, a polymer electrolyte membrane fuel cell.

A definition of a substituent used in the formulas described above is as follows.

Examples of the C1-C20 alkyl group include methyl, ethyl, propyll, isobuthyl, sec-buthyl, pentyl, iso-amyl, and hexyl. At least one of the hydrogen atoms in the alkyl may be substituted with a halogen atom, a C1-C20 alkyl group substituted with a halogen atom (examples: $CCF_3$, $CHCF_2$, $CH_2F$, and $CCl_3$), a hydroxyl group, a nitro group, a cyano group, an amino group, an amidino group, hydrazine, hydrazone, carboxyl group or a salt thereof, a sulfonic acid group or a salt thereof, phosphoric acid or a salt thereof, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, or a C6-C20 heteroarylalkyl group.

Examples of the C2-C20 alkylene group include methylene and ethylene. At least one hydrogen atom of the alkylene may be substituted with the same substituent as that of the alkyl group.

Reaction Formula 1

Examples of the unsubstituted C1-C20 hydroxyalkyl group include 2-hydroxyethyl, 3-hydroxypropyl, 4-hydroxybuthyl. At least one hydrogen atom of the hydroxyalkyl may be substituted with the same substituent as that of the alkyl group.

Examples of the unsubstituted C1-C20 hydroxyalkylamino group include —NH—CH$_2$CH$_2$—OH. At least one hydrogen atom of the hydroxyalkylamino may be substituted with the same substituent as that of the alkyl group.

When the solid proton conductor according to an embodiment is used to prepare the polymer electrolyte membrane, catalyst poisoning of phosphoric acid and leakage of phosphoric acid during operation, which are generated while polybenzimidazole and phosphoric acid are used to prepare a polymer electrolyte membrane, are prevented.

Therefore, the solid proton conductor has excellent proton conductivity and excellent heat resistance without using a liquid medium, such as water or phosphoric acid, at a high temperature. Accordingly, an electrolyte membrane for a fuel cell having excellent heat resistance and excellent proton conductivity may be prepared by using the solid proton conductor, and a fuel cell having improved cell voltage and ionic conductivity characteristics may be prepared by coating the electrolyte membrane on an electrode while preparing a MEA or adding the solid proton conductor to the composition for forming a electrode catalyst layer.

The embodiments will now be described in greater detail with reference to the following examples. However, these examples are for illustrative purposes only and are not intended to limit the scope of the embodiments.

Synthesis Example 1

Preparation of Sulfonated Poly Arylene Ether Sulfone (PSF) of Formula 7 (m=1, n=1, k=400)

S-DCDPS (0.1 mole), DCDPS (0.35 mole), HFIPDP (0.459 mole), and potassium carbonate (0.55 mole) were refluxed for 12 hours at 160° C. by using NMP (120 mL) and toluene (100 mL) as a solvent, generated water was removed, and when water did not flow through a dean stock, toluene was removed via a valve. Then, the temperature of the reaction mixture was increased to 180° C. over 2 hours, and then a polymeric reaction was performed for 4 hours.

Example 1

Preparation of Electrolyte Membrane

PSF obtained according to Synthesis Example 1 was dissolved in 18 g of NMP so as to obtain a PSF solution of 10 wt %.

0.6 g of the compound of Formula 2 as Phosmer M, and 0.012 g of AIBN as a polymeric initiator were dropwise added to 2 g of the PSF solution, and then the mixture was stirred at room temperature for 5 hours.

The reaction resultant was casted, dried for 12 hours at 60° C., and reacted for 7 hours at 80° C. and 3 hours at 120° C. so as to obtain electrolyte membranes.

While preparing the electrolyte membranes, a molecular weight of a repeating unit of each of the PSF and the phosmer was calculated as shown in Table 1 below in order to determine a suitable blending ratio of PSF (Mw=600,000 g/mol) and phosmer (Mw=194 g/mol), and thus a plurality of electrolyte membranes were prepared by changing a mixing mole ratio of the PSF and the phosmer as shown in Table 1. In this regard, the mixing mole ratio was changed to 1:1, 1:2, 1:3, 1:5, and 1:10, and amounts of the PSF and the phosmer are as shown in Table 1.

TABLE 1

| PSF:Mixing Mole ratio of Phosmer | Amount of PSF (g) | Amount of Phosmer (g) |
|---|---|---|
| 1:1 | 1.226 | 0.194 |
| 1:2 | 1.226 | 0.388 |
| 1:3 | 1.226 | 0.582 |
| 1:5 | 1.226 | 0.970 |
| 1:10 | 1.226 | 1.940 |

Example 2

Preparation of Electrolyte Membrane

Acid doped titanium dioxide nano particles (AMT600, Tayca corp., Japan) (s-TiO$_2$) were added to a mixed solution of the PSF solution prepared in Example 1 and the compound (Phosmer-M) of Formula 2 (PSF:phosmer=1:3 mole ratio).

The acid doped titanium dioxide nano particles (NP) in a dried form were obtained by adding titanium dioxide particles in a phosphoric acid solution of 20 wt %, stirring the mixture for at least 6 hours, continuously repeating performing centrifugal separation and cleaning, and leaving the mixture for at least a day in a vacuum oven.

A plurality of electrolyte membranes were prepared by changing the amounts of the acid doped titanium oxide nano particles. In this regard, the amounts of the acid doped titanium oxide nano particles were 1 part by weight, 3 parts by weight, and 5 parts by weight based on 100 parts by weight of total weight of the PSF and the phosmer. The electrolyte membranes were prepared in the same manner as Example 1.

Example 3

Preparation of Electrolyte Membrane

Electrolyte membranes were prepared in the same manner as Example 1, except that 0.868 g of the compound (Phosmer-PE) of Formula 3, 0.693 g of the compound of Formula 4, and 0.96 g of the compound of Formula 5 were each used instead of 0.582 g of the compound (Phosmer-M) of Formula 2.

Comparative Example 1

0.1 g of benzimidazole was dropwise added to 10 g of a nafion solution of 5 wt % and then the resultant was stirred for 1 hour to prepare a solution. Here, a mixing mole ratio of the nafion included in the nafion solution and benzimidazole was 1:1.

The solution was casted in polytetrafluoroethylene, and then dried for 1 day at 60° C. so as to obtain a uniform electrolyte membrane.

Proton conductivity at 150° C. of the electrolyte membranes prepared according to Example 1 and Comparative Example 1 is shown in Table 2 below.

TABLE 2

| | Mixing Mole ratio of PSF Solution and Phosmer | Proton Conductivity (S/cm) @ 150° C. |
|---|---|---|
| Example 1 | 1:1 | $8.351 \times 10^{-4}$ |
| | 1:2 | $2.983 \times 10^{-3}$ |
| | 1:3 | $4.110 \times 10^{-3}$ |
| | 1:5 | $5.492 \times 10^{-3}$ |
| | 1:10 | $7.984 \times 10^{-3}$ |
| Comparative Example 1 | 1:1 | $2.450 \times 10^{-3}$ |

Proton conductivity at 150° C. of the electrolyte membranes prepared according to Example 1 and Example 2 is shown in Table 3 below.

TABLE 3

| | $TiO_2$ ($H^+$) (Parts by Weight) | Proton Conductivity (S/cm) @ 150° C.* |
|---|---|---|
| Example 1 | 0 | $4.110 \times 10^{-3}$ |
| Example 2 | 1 | $3.650 \times 10^{-3}$ |
| | 3 | $1.813 \times 10^{-3}$ |
| | 5 | $7.850 \times 10^{-4}$ |

*A mixing mole ratio of PSF and the phosmer is 1:3, and the weight average molecular weights of PSF and the phosmer are respectively 600,000 and 194 g/mol.

Figure 1:
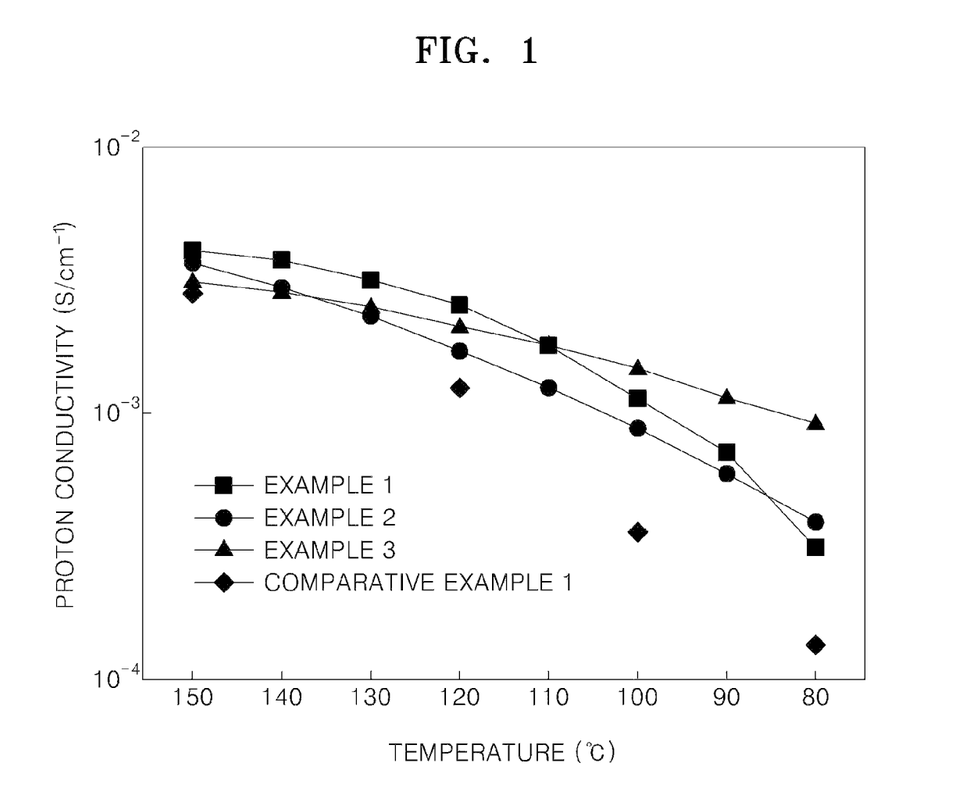
FIG. 1 is a graph illustrating proton conductivity according to the temperature of the polymer electrolyte membranes according to Examples 1 through 3 and Comparative Example 1.

The ionic conductivity of the electrolyte membranes prepared according to Examples 1 and 2 was evaluated by giving a voltage bias of 10 mV at a frequency of 1 Hz to 1 MHz to the electrolyte membranes, scanning temperatures, and measuring resistance, and is shown in Table 4 and FIG. 1

TABLE 4

| | Conductivity σ (S/cm) | | |
|---|---|---|---|
| Temperature (° C.) | PSF/Phosmer M | PSF/ Phosmer M/s-$TiO_2$ | PSF/Phosmer-PE |
| 150 | 4.11E−03 | 3.65E−03 | 3.10E−03 |
| 140 | 3.80E−03 | 2.96E−03 | 2.85E−03 |
| 130 | 2.95E−03 | 2.29E−03 | 2.50E−03 |
| 120 | 2.55E−03 | 1.71E−03 | 2.12E−03 |
| 110 | 1.29E−03 | 1.26E−03 | 1.79E−03 |
| 100 | 1.00E−03 | 8.83E−04 | 1.45E−03 |
| 90 | 5.47E−04 | 5.93E−04 | 1.14E−03 |
| 80 | 3.17E−04 | 3.91E−04 | 9.08E−04 |

In Table 4, a mole ratio of PSF and phosmer M is 1:3, a mole ratio of PSF and phosmer PE is 1:3, and the amount of s-$TiO_2$ is 3 parts by weight based on 100 parts by weight of the total weight of PSF and phosmer.

Figure 2:
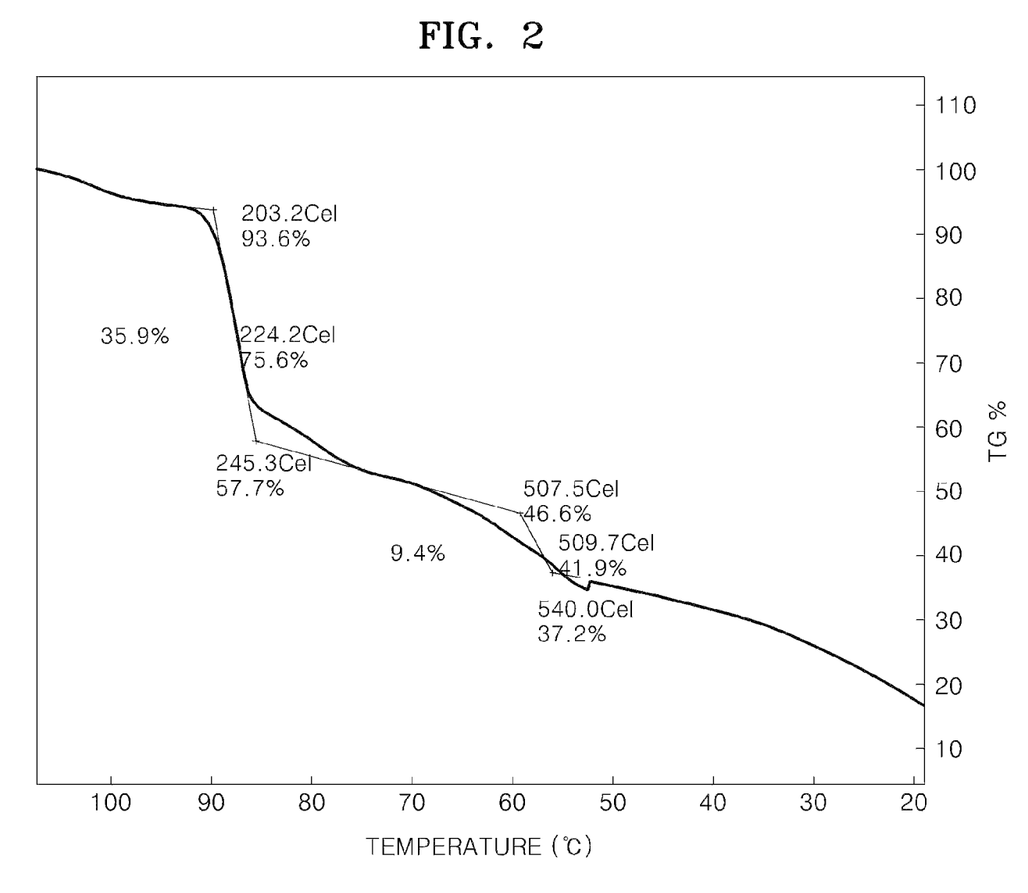
FIG. 2 is a graph illustrating a result of thermogravimetric analysis of the electrolyte membrane prepared according to Example 1.

Thermogravimetric analysis was performed on the electrolyte membranes (PSF:phosmer=1:3 mole ratio) prepared according to Example 1, and the results are shown in FIG. 2.

Referring to FIG. 2, it is seen that a thermal decomposition characteristic of the electrolyte membranes of Example 1 is excellent.

Example 4

Preparation of Fuel Cell

Commercial Elechem electrodes using 1 mg of Pt were used as a cathode and an anode.

A fuel cell was prepared by disposing the electrolyte membrane prepared according to Example 2 between the cathode and the anode. Here, the mixing mole ratio of the PSF and the phosmer of the electrolyte membrane of Example 2 was 1:3, and the amount of the acid doped titanium dioxide nano particles was 1 part by weight based on 100 parts by weight of the total weight of the PSF and the phosmer.

Characteristics of the fuel cell were measured by generating power in the fuel cell by circulating hydrogen in the anode at a flow rate of 100 ccm and air in the cathode at a flow rate of 200 ccm, at a temperature of 120° C. and under a condition that the electrolyte membrane was not humidified.

Example 5

Preparation of Fuel Cell

First, a slurry for forming an anode catalyst layer was prepared by mixing 0.2 g of PtRu/C as an anode catalyst material, 0.005 g of polyvinylidene fluoride (PVdF) binder, 0.6 g of PSF/phosmer solution, and 1.0 g of NMP, and stirring the mixture at room temperature (20° C.).

The PSF/phosmer solution was prepared by obtaining a PSF solution of 10 wt % by dissolving PSF prepared according to Synthesis Example 1 in 18 g of NMP, and adding 0.6 g of phosmer M, constituting the compound of Formula 2, and 0.01 g of AIBN, constituting a polymerization initiator, to 2 g of the PSF solution.

An anode was prepared by coating the slurry for forming an anode catalyst layer on a carbon support (carbon paper) by using a bar and heat treating the resultant for 1 hour at 80° C., 30 minutes at 120° C., and 10 minutes at 150° C.

A slurry for forming a cathode catalyst layer was obtained according to the same manner as the slurry for forming an anode catalyst layer, except that 0.2 g of PtCo/C was used instead of 0.2 g of PtRu/C, constituting an anode catalyst material, and a cathode was prepared by using the slurry for forming a cathode catalyst layer.

Then, a fuel cell was prepared by disposing the electrolyte membrane of Example 2 between the anode and the cathode prepared as described above.

Characteristics of the fuel cell were measured by generating power in the fuel cell by circulating hydrogen in the anode at a flow rate of 100 ccm and air in the cathode at a flow rate of 200 ccm, at a temperature of 150° C. and under a condition that the electrolyte membrane was not humidified.

Example 6

Preparation of Electrolyte Membrane

Indium doped tin phosphate inorganic matter, i.e. $Sn_{0.9}In_{0.1}P_2O_7$, was added to the PSF solution prepared in Example 1 and the compound (Phosmer-M) of Formula 2 (PSF:phosmer=1:3 mole ratio).

Characteristics of the fuel cell were measured by generating power in the fuel cell by circulating hydrogen in the anode at a flow rate of 100 ccm and air in the cathode at a flow rate of 200 ccm, at a temperature of 150° C. and under a condition that the electrolyte membrane was not humidified.

Comparative Example 2

Preparation of Fuel Cell

Commercial E-Tek electrodes doped with 2.0 mg of Pt were used as a cathode and an anode.

A fuel cell was prepared by disposing the electrolyte of Comparative Example 1 between the cathode and the anode.

Characteristics of the fuel cell were measured by generating power in the fuel cell by circulating hydrogen in the anode at a flow rate of 100 ccm and air in the cathode at a flow rate of 200 ccm, at a temperature of 150° C. and under a condition that the electrolyte membrane was not humidified.

Cell voltage characteristics of the fuel cells of Examples 4 and 5, and Comparative Example 2 according to a current density at 150° C. are shown in Table 5.

TABLE 5

|  | Example 4 | Example 5 | Comparative Example 2 |
| --- | --- | --- | --- |
| Whether Electrode Ionomer is Added | X | ○ | X |
| Polymer Electrolyte Membrane | (Elechem Electrode) PSF/Phosmer/NP | (PSF/Phosmer/NP) PSF/Phosmer/NP | (E-Tek Electrode) Nafion/Benzimidazole |
| Cell Voltage | 0.6 V @ 4.0 mAcm$^{-2}$ (@150° C.) | 0.6 V @ 5.0 mAcm$^{-2}$ (@150° C.) | 0.6 V @ 2.5 mAcm$^{-2}$ (@150° C.) |

The amounts of the indium doped tin phosphate were 10 parts by weight and 20 parts by weight based on 100 parts by weight of total weight of the PSF and the phosmer. The electrolyte membranes were prepared in the same manner as Example 1.

Example 7

Preparation of Fuel Cell

First, a slurry for forming an anode catalyst layer was prepared by mixing 0.2 g of PtRu/C as an anode catalyst material, 0.005 g of polyvinylidene fluoride (PVdF) binder, 0.6 g of PSF/phosmer solution, and 1.0 g of NMP, and stirring the mixture at room temperature (20° C.).

The PSF/phosmer/($Sn_{0.9}In_{0.1}P_2O_7$) solution was prepared by obtaining a PSF solution of 10 wt % by dissolving PSF prepared according to Synthesis Example 1 in 18 g of NMP, and adding 0.6 g of phosmer M, constituting the compound of Formula 2, 0.08 g of $Sn_{0.9}In_{0.1}P_2O_7$, and 0.01 g of AIBN, constituting a polymerization initiator, to 2 g of the PSF solution.

An anode was prepared by coating the slurry for forming an anode catalyst layer on a carbon support (carbon paper) by using a bar and heat treating the resultant for 1 hour at 80° C., 30 minutes at 120° C., and 10 minutes at 150° C.

A slurry for forming a cathode catalyst layer was obtained according to the same manner as the slurry for forming an anode catalyst layer, except that 0.2 g of PtCo/C was used instead of 0.2 g of PtRu/C, constituting an anode catalyst material, and a cathode was prepared by using the slurry for forming a cathode catalyst layer.

Then, a fuel cell was prepared by disposing the electrolyte membrane of Example 2 between the anode and the cathode prepared as described above.

Figure 3:
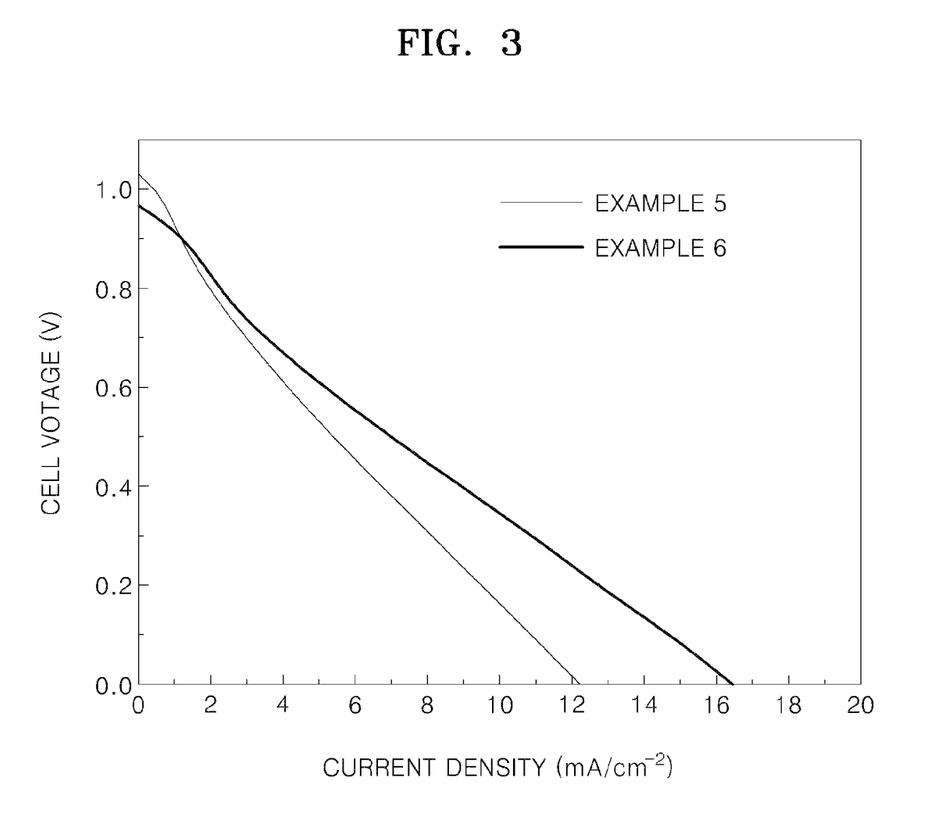
FIG. 3 is a graph illustrating a cell voltage characteristic according to current density in fuel cells according to Examples 4 and 5.

FIG. 3 is a graph illustrating cell voltage characteristics according to current density of the fuel cells of Examples 4 and 5.

Figure 4:
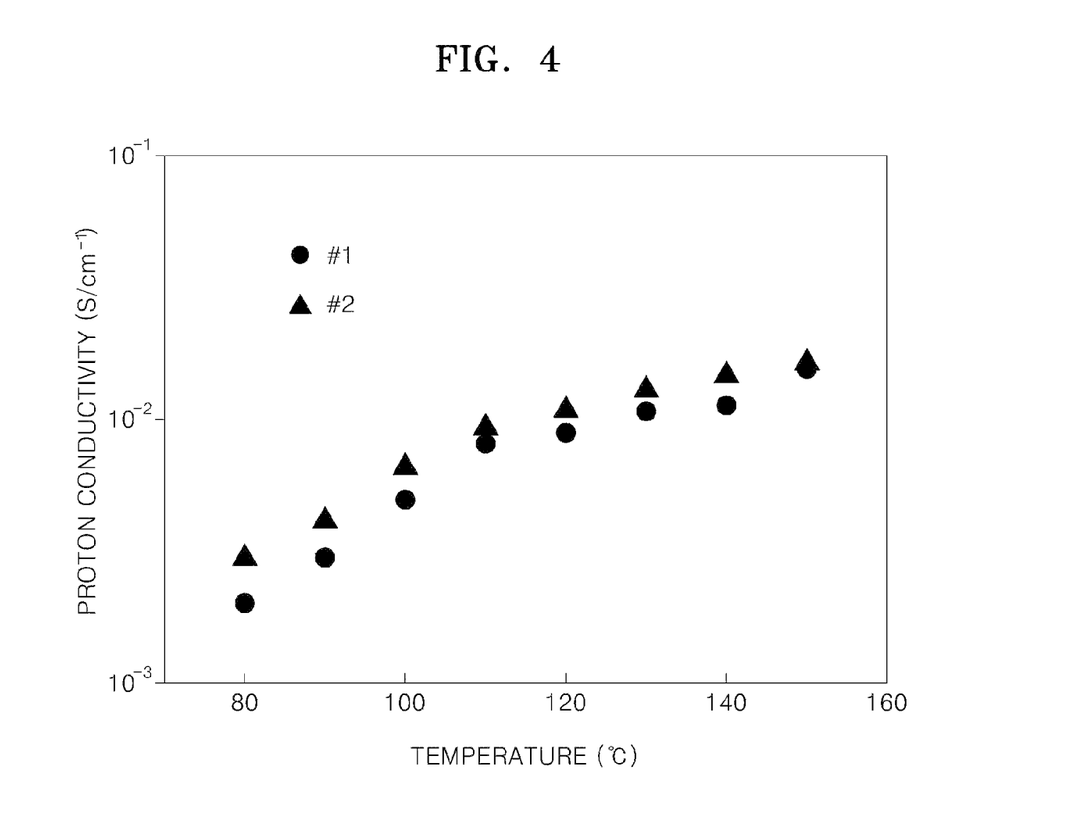
FIG. 4 is a graph illustrating proton conductivity according to temperature, in a polymer electrolyte membrane according to Example 6.

The ionic conductivity of the electrolyte membrane prepared according to Example 6 was evaluated by giving a voltage bias of 10 mV at a frequency of 1 Hz to 1 MHz to the electrolyte membrane, scanning temperature, and measuring resistance, and is shown in Table 6 and FIG. 4. Referring to FIG. 4, #1 and #2 are when $Sn_{0.9}In_{0.1}P_2O_7$ (hereinafter, also referred to as SIPO) is respectively 10 parts by weight and 20 parts by weight.

TABLE 6

| | Proton conductivity σ(S/cm) | |
| --- | --- | --- |
| Temperature (° C.) | PSF/Phosmer M/SIPO (10%) #1 | PSF/Phosmer M/SIPO (20%) #2 |
| 150 | 0.0144 | 0.01635 |
| 140 | 0.0113 | 0.01465 |
| 130 | 0.0107 | 0.01287 |
| 120 | 0.0899 | 0.01086 |
| 110 | 0.00809 | 0.00935 |
| 100 | 0.00499 | 0.00659 |
| 90 | 0.00300 | 0.00410 |
| 80 | 0.00201 | 0.00296 |

Figure 5:
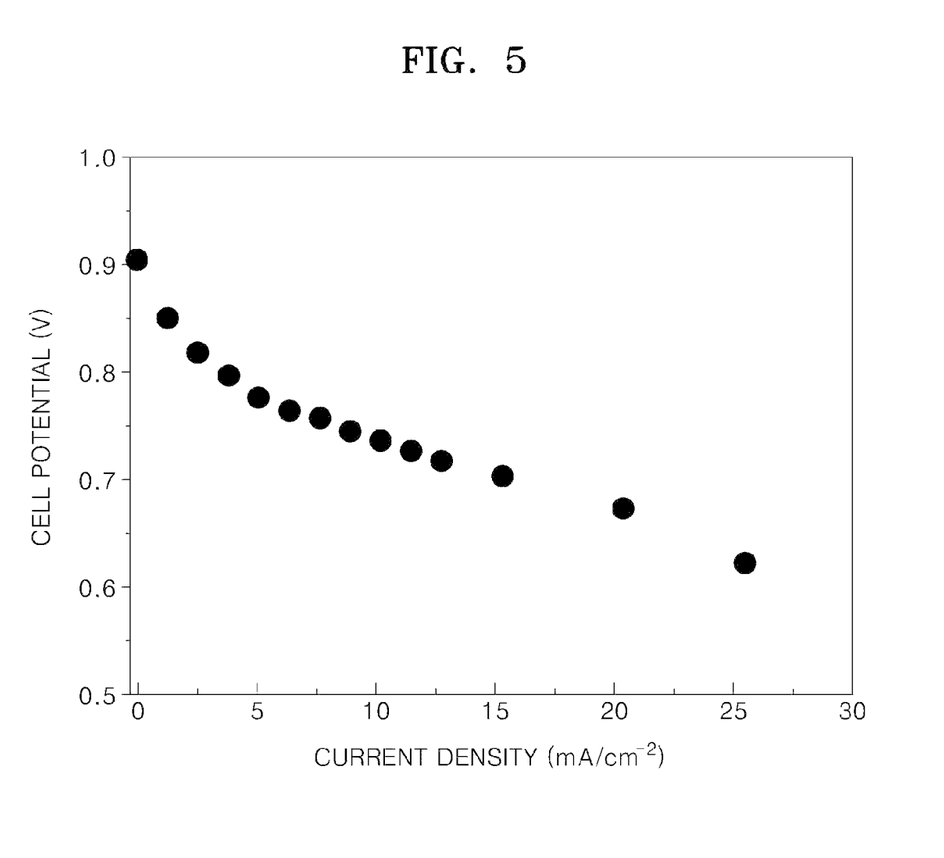
FIG. 5 is a graph illustrating a cell voltage characteristic according to a current density, in a fuel cell according to Example 7.

Also, in the fuel cell according to Example 7, cell voltage characteristics according to a current density are shown in FIG. 5.

Referring to FIG. 5, it is seen that the fuel cell of Example 7 has excellent cell potential characteristics.

Although a few embodiments of the present invention have been shown and described, it would be appreciated by those skilled in the art that changes may be made in this embodi-

What is claimed is:

1. A solid proton conductor for a fuel cell, the solid proton conductor comprising:

a sulfonated polymer; wherein the sulfonated polymer comprises a compound represented by Formula 8 below:

Formula 8 wherein the $R_1$'s are identical or different, and are each independently a hydrogen, a C1-C10 alkyl group, a C2-C10 alkenyl group, a phenyl group, or a nitro group, p is an integer in a range of about 0 to about 4, X is —C(CF$_3$)$_2$—, —C(CH$_3$)$_2$—, or —PY'(=O)—, where Y' is H or C$_6$H$_5$, M is Na, K, or H, m is a real number in a range of about 0.1 to about 10, n is a real number in a range of about 0.1 to about 10, and k is a real number in a range of about 5 to about 500; and a hydrophilic polymer having an acid group, constituting a polymer solvent, providing a proton mobile path.

2. The solid proton conductor of claim 1, wherein the hydrophilic polymer comprises a polymer containing phosphoric acid group.

3. The solid proton conductor of claim 2, wherein the polymer containing phosphoric acid group is a polymerization product of a compound represented by Formula 1, or a compound represented by Formula 1a:

Formula 1 wherein X is an unsubstituted or substituted C1-C20 alkylene group, a is an integer in a range of about 1 to about 10, $R_1$ is hydrogen or a C1-C20 alkyl group, $R_2$ is selected from a group consisting of hydrogen, an unsubstituted or substituted C1-C20 alkyl group, an unsubstituted or substituted C1-C20 hydroxyalkyl group, and an unsubstituted or substituted C1-C20 hydroxyalkylamino group, and

Formula 1a wherein X and Y are each independently an unsubstituted or substituted C1-C20 alkylene group, a and b are each independently an integer in a range of about 1 to about 10, and $R_1$ and $R_3$ are each independently hydrogen or a C1-C20 alkyl group.

4. The solid proton conductor of claim 3, wherein the compound represented by Formula 1 or 1a comprises at least one compound selected from the compounds represented by Formulas 2 through 7 below:

Formula 2

Formula 3

Formula 4

Formula 5 wherein n is an integer in a range of about 2 to about 10,

Formula 6 wherein $R_{10}$ and $R_{13}$ are each independently a C1-C20 alkyl group, $R_{11}$ and $R_{12}$ are each independently hydrogen or a C1-C20 alkyl group, and t and w are each independently an integer in a range of about 1 to about 10, and Formula 7

5. The solid proton conductor of claim 1, wherein the sulfonated polymer comprises at least one selected from a group consisting of sulfonated polyarylenesulfone, perfluorinated sulfonic acid group containing polymer, and sulfonated polyether ether ketone.

6. The solid proton conductor of claim 1, wherein the sulfonated polymer comprises a compound represented by Formula 9:

Formula 9 wherein m is a real number in a range of about 0.1 to about 4, n is a real number in a range of about 0.1 to about 4, and k is a real number in the range of about 5 to about 500.

7. The solid proton conductor of claim 1, wherein a mixing mole ratio of the sulfonated polymer and a monomer for forming the hydrophilic polymer is in a range of about 1:1 to about 1:10.

8. The solid proton conductor of claim 1, further comprising at least one of an additive selected from the group consisting of acid processed oxide nano particles and acid processed oxide nano rods.

9. The solid proton conductor of claim 8, wherein the oxide of the nano particles and nano rods comprises at least one of the group consisting of titania ($TiO_2$), silica ($SiO_2$), and tin oxide ($SnO_2$).

10. The solid proton conductor of claim 7, further comprising an additive wherein an amount of the additive is in a range of about 1 to about 20 parts by weight based on 100 parts by weight of a total weight of the sulfonated polymer and the monomer for forming the hydrophilic polymer.

11. The solid proton conductor of claim 7, further comprising a compound represented by Formula 10:

$$A_{1-x}B_xP_2O_7 \quad \text{Formula 10}$$

wherein A is one selected from the group consisting of tin (Sn), titanium (Ti), silicon (Si), germanium (Ge), lead (Pb), zirconium (Zr), hafnium (Hf), and a combination thereof, B is one selected from the group consisting of indium (In), boron (B), aluminum (Al), gallium (Ga), scandium (Sc), ytterbium (Yb), yttrium (Y), and a combination thereof, and x is in a range of about 0.001 to about 0.1.

12. The solid proton conductor of claim 11, wherein the compound represented by Formula 10 is $Sn_{0.9}In_{0.1}P_2O_7$ or $Sn_{0.9}Al_{0.1}P_2O_7$.

13. The solid proton conductor of claim 11, wherein an amount of the compound represented by Formula 10 is in a range of about 1 part by weight to about 30 parts by weight based on 100 parts by weight of a total amount of the sulfonated polymer and the monomer for forming the hydrophilic polymer.

14. An electrolyte membrane for a fuel cell, the electrolyte membrane comprising a solid proton conductor for a fuel cell, the solid proton conductor comprising:
a sulfonated polymer wherein the sulfonated polymer comprises a compound represented by Formula 8 below:

Formula 8 wherein the $R_1$'s are identical or different, and are each independently a hydrogen, a C1-C10 alkyl group, a C2-C10 alkenyl group, a phenyl group, or a nitro group, p is an integer in a range of about 0 to about 4, X is —C(CF_3)_2—, —C(CH_3)_2—, or —PY'(=O)—, where Y' is H or $C_6H_5$, M is Na, K, or H, m is a real number in a range of about 0.1 to about 10, n is a real number in a range of about 0.1 to about 10, and k is a real number in a range of about 5 to about 500; and
a hydrophilic polymer having an acid group, constituting a polymer solvent, providing a proton mobile path.

15. The electrolyte membrane of claim 14, wherein the hydrophilic polymer comprises a polymer containing phosphoric acid group.

16. The electrolyte membrane of claim 15, wherein the polymer containing the phosphoric acid group is a polymerization product of a compound represented by Formula 1, or a compound represented by Formula 1a:

Formula 1 wherein X is an unsubstituted or substituted C1-C20 alkylene group, a is an integer in a range of about 1 to about 10, $R_1$ is hydrogen or a C1-C20 alkyl group, $R_2$ is selected from a group consisting of hydrogen, an unsubstituted or substituted C1-C20 alkyl group, an unsubstituted or substituted C1-C20 hydroxyalkyl group, and an unsubstituted or substituted C1-C20 hydroxyalkylamino group, and Formula 1a wherein X and Y are each independently an unsubstituted or substituted C1-C20 alkylene group, a and b are each independently an integer in the range of about 1 to about 10, and $R_1$ and $R_3$ are each independently hydrogen or a C1-C20 alkyl group.

17. The electrolyte membrane of claim 14, the solid proton conductor further comprises a compound represented by Formula 10:

$$A_{1-x}B_xP_2O_7 \qquad \text{Formula 10}$$

wherein A is one selected from the group consisting of tin (Sn), titanium (Ti), silicon (Si), germanium (Ge), lead (Pb), zirconium (Zr), hafnium (Hf), and a combination thereof, B is one selected from the group consisting of indium (In), boron (B), aluminum (Al), gallium (Ga), scandium (Sc), ytterbium (Yb), yttrium (Y), and a combination thereof, and x is in a range of about 0.001 to about 0.1.

18. The electrolyte membrane of claim 17, wherein the compound represented by Formula 10 is $Sn_{0.9}In_{0.1}P_2O_7$ or $Sn_{0.9}Al_{0.1}P_2O_7$.

* * * * *